United States Patent [19]

Wheatley

[11] Patent Number: 5,615,981
[45] Date of Patent: Apr. 1, 1997

[54] FORMING THREADED HOLES

[76] Inventor: Douglas J. Wheatley, Hudson Hill, Hedingham Road, Wethersfield, Braintree, Essex CM7 4EH, Great Britain

[21] Appl. No.: 525,543

[22] PCT Filed: Mar. 17, 1994

[86] PCT No.: PCT/GB94/00544

§ 371 Date: Oct. 30, 1995

§ 102(e) Date: Oct. 30, 1995

[87] PCT Pub. No.: WO94/21409

PCT Pub. Date: Sep. 29, 1994

[30] Foreign Application Priority Data

Mar. 18, 1993 [GB] United Kingdom ............... 9305557

[51] Int. Cl.⁶ ............... B23B 35/00; B23B 41/08; B23B 51/00
[52] U.S. Cl. ............... 408/1 R; 137/318; 408/56; 408/80; 408/127; 408/206; 408/222; 408/224; 470/199
[58] Field of Search ............... 408/1 R, 56, 61, 408/24, 30, 67, 80, 117, 118, 127, 222, 224, 204, 206, 234, 77; 137/317, 318; 470/198, 199

[56] References Cited

U.S. PATENT DOCUMENTS

| 2,369,273 | 2/1945 | Bakewell | 408/222 |
|---|---|---|---|
| 3,293,952 | 12/1966 | Fairbanks | 408/56 |
| 3,995,655 | 12/1976 | Sands | 137/318 |
| 4,519,415 | 5/1985 | Carn | 137/318 |
| 4,563,924 | 1/1986 | Runkle et al. | 408/56 |

FOREIGN PATENT DOCUMENTS

| 2231914 | 12/1974 | France | 137/318 |
|---|---|---|---|
| 2427616 | 12/1975 | Germany | 470/199 |
| 184658 | 11/1982 | Japan | 408/56 |
| 183335 | 7/1989 | Japan | 408/56 |

Primary Examiner—Daniel W. Howell
Attorney, Agent, or Firm—Andrus, Sceales, Starke & Sawall

[57] ABSTRACT

A threaded hole may be formed in a lid of an underground petrol tank without emptying the tank or removing the lid, using a tool (FIG. 3) having a taper tap section (61), an intermediate tap section (62) and a final tap section (63). At the leading end of the tool, there is a reamer section (60) and supported on the free end of the tool is a centerless hole cutter (50). A resilient mounting transmits drive from the main part of the tool to the cutter (50), but allows the cutter to float. A sleeve (23) surrounds the tool, so that a column of inert gas may be caused to lie in the cutting region. A magnet (57) mounted within the cutter (50) catches and holds a released disk of the cover. Also described is a rig (FIG. 1), for operating the tool (FIG. 3), and a method (FIG. 5) of securing a collar threaded into a hole formed by the tool.

15 Claims, 5 Drawing Sheets

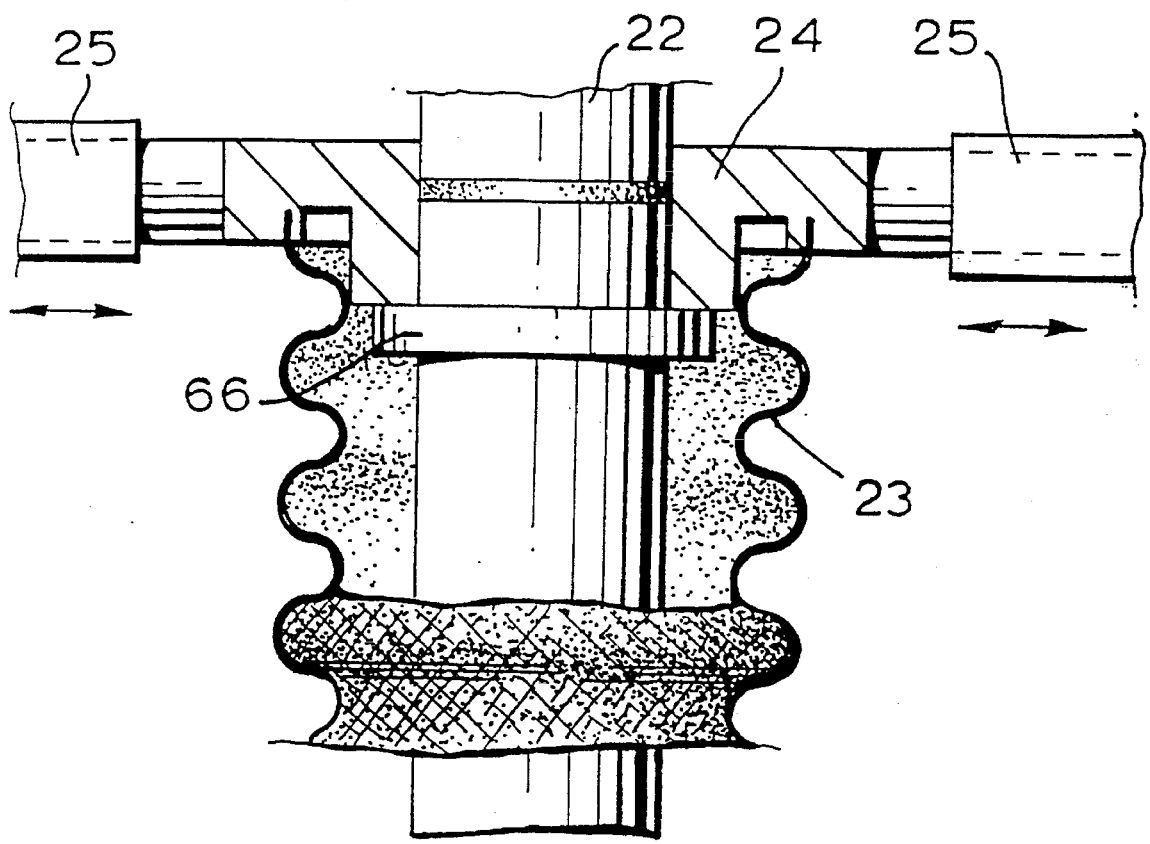

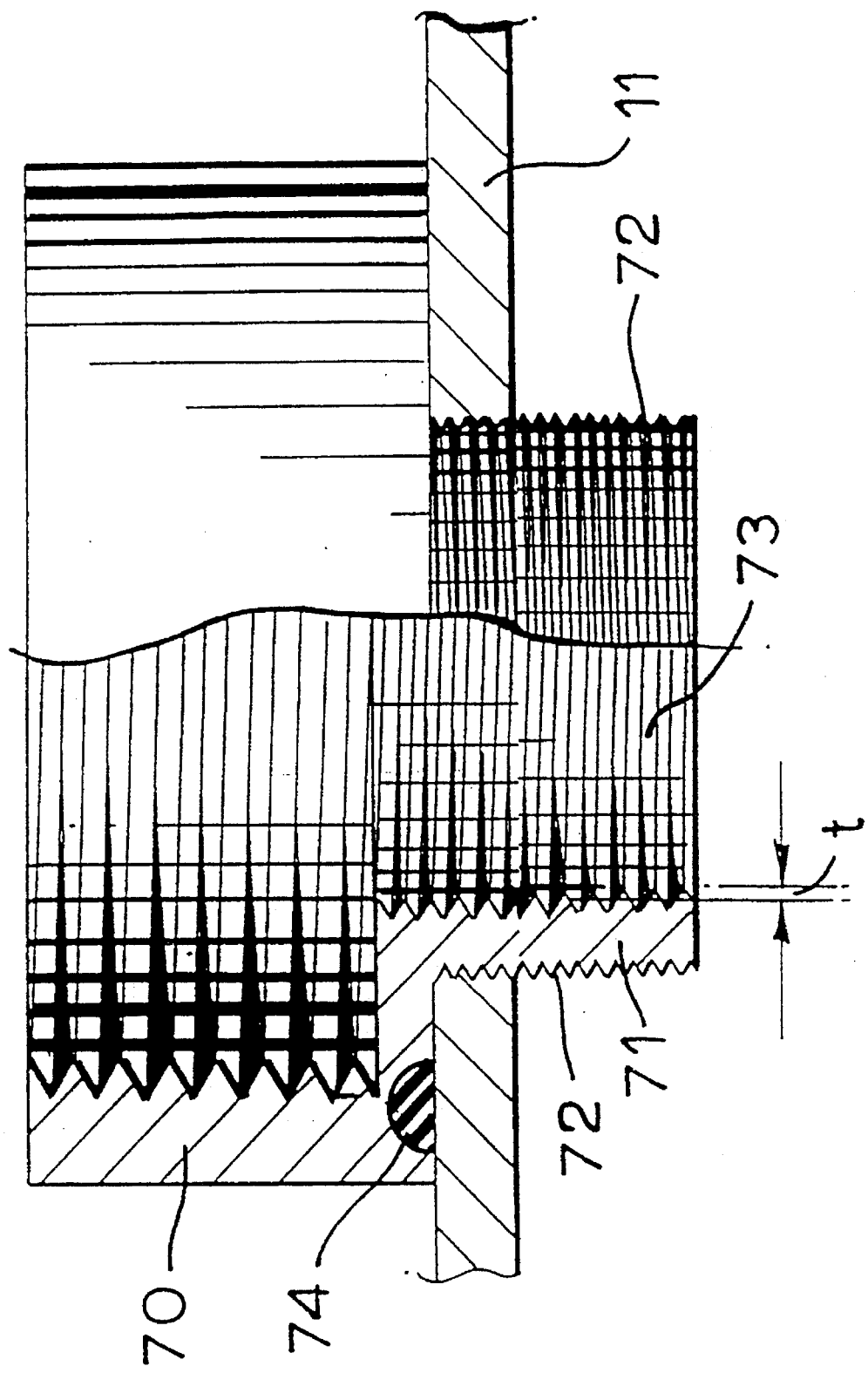

FORMING THREADED HOLES

This invention relates to a method of forming a threaded hole, for example in a tank or tank lid, and to tools and rigs for forming such threaded holes. The invention further relates to a method of securing an internally-threaded collar in such a threaded hole.

Though various aspects of this invention may find applicability in diverse areas of industry, the invention is especially suitable for forming threaded holes in a tank, and particularly in an underground tank for containing a flammable and volatile liquid such as petrol. In view of this, the invention will hereinafter expressly be described with reference to underground petrol tanks, though it will be appreciated that the invention is not to be regarded as being limited thereto.

A common form of underground petrol tank comprises a steel (but sometimes reinforced plastic) vessel buried below ground level and having a neck upstanding from an upper part thereof, the neck having at its upper end an outwardly directed flange. The tank is closed by means of a lid which fits over the neck opening and is bolted to the flange in a liquid and gas-tight manner. Pipes for filling and drawing liquid from the tank, along with other services such as a level indicator, pass through the lid and are connected to appropriate pipe-work and so on within a chamber in the ground above the lid, which chamber is conventionally closed by a man-hole cover.

In one common arrangement for such a tank, the lid closing the neck is made of steel and has one or more circular openings therethrough, in each of which is welded a steel sleeve having upper and lower internal threads. The sleeves allow the connection of the required pipes to the tank, from above the lid, and of further pipes extending down into the tank.

Recent legislation and regulations based mainly on environmental grounds may require the provision of further services within an underground petrol tank. For example, in order to reduce the risk of overfilling a tank, certain authorities require an alarm system to be fitted to a tank, to give an alarm when the level within the tank rises above some predetermined level. In order to do this, and presuming there is no unused opening through the tank lid, a further opening must be formed in the tank lid, through which the required service may be fitted. Generally speaking, the further opening may be formed only by removing the tank lid, drilling and tapping the new opening and then replacing the tank lid.

In the case of a below-ground garage forecourt tank intended to hold petrol, the opening of the tank by removing the tank lid has to be performed with great caution and special measures have to be taken in order to avoid the risk of fire and explosion. Generally speaking, this may be performed only once appropriate notice has been given to the local government authority. The tank must be emptied of all petrol, and is then filled with water to displace all petrol fumes and vapours. The above-lid pipe-work and other services have to be disconnected from the lid, and then the ring of bolts around the lid may be removed. Once done, the lid may be lifted together with the fill-pipe and other equipment projecting downwardly from the lid. After the lid has been drilled and tapped, it is refitted to the tank and the tank then has to be subjected to a pressure test, in order to ensure that a perfect seal has been formed between the tank lid and the neck flange. Once tested, the pipe-work and services are re-made to the tank lid, and then the tank has to be completely drained of water, before it can be placed back in service. Moreover, the water will be contaminated and so has to be disposed of with considerable care.

It will be appreciated that the above procedures take a most considerable time and may be performed only by skilled personnel; a tank typically is out of service for one to three days if the lid has to be removed, for any reason. The effective cost to the garage proprietor is thus relatively high.

Though hole cutters including a threaded portion for tapping a cut hole are known (for example from JP-A-57184658), these have a pilot drill which leads the hole cutter. Consequently, as soon as the pilot drill penetrates the workpiece (a pipe, in the case of JP-A-57184658), the hole-cutting operation is exposed to any vapour in the pipe. This tool is thus quite unsuitable for use in a hazardous environment, such as the cutting of a threaded hole through the lid of a petrol tank.

It is a principal aim of the present invention to provide both a method of and apparatus for forming a tapped hole through a metal plate, which method and apparatus are particularly suitable for use on an underground petrol tank, and which allow the drilling and tapping of the hole through, for example, the tank lid without the need to remove the lid from the tank itself.

According to a first aspect of the present invention, there is provided a method of forming a threaded hole through a plate such as a tank wall, comprising advancing a rotary hole-cutter into the plate to form a circular hole therethrough, continuing to advance the hole-cutter beyond the plate and following the hole-cutter into the cut hole with a tapered tap having a required thread form whilst rotating the tap to form a thread in the hole, which method is characterised in that the circular hole is formed with a centre-less hole cutter and in that an inert atmosphere is maintained on the side of the plate from which the cutting was commenced, in the region of the hole being cut through the plate both during the cutting and subsequent tapping thereof.

In the method of this invention, safety in operation is assured by the provision of an inert atmosphere in the region in which the hole is firstly being cut and secondly being tapped. By excluding all oxygen, the risk of an explosive mixture of petrol vapour and air is obviated and so the cutting and tapping operation may proceed safely. Moreover, by consecutively cutting the hole and immediately following the hole cutter with a tap, the hole formed in the plate (such as the tank lid) remains effectively plugged, again reducing the risk of the formation of an explosive mixture of petrol vapour and air.

Most preferably, the inert atmosphere is maintained by surrounding the hole-cutter and the tap with a sleeve which also bears on the plate, and supplying an inert gas, such as nitrogen or carbon dioxide, to the interior of the sleeve.

Once a tapped hole has been formed, it may be necessary to mount on the tank lid an externally threaded collar engaged with the hole, in order to allow appropriate equipment to be fitted to the tank lid. For instance, if a coarse thread is required and yet the tank lid is not particularly thick, tapping the coarse thread in the lid will result in too few threads in the lid to give a secure mounting. As such, a fine thread may be tapped in the lid, the collar having a corresponding external thread for engaging the lid, and also having a bore tapped with the required coarse thread. The collar may be made sufficiently long to ensure a sufficient number of the coarse threads are present, for strength requirements.

A collar fitted into a threaded hold in a tank lid must make a fluid and gas-tight seal to the lid and, once fitted, should be resistant to ready removal. Such an internally-threaded collar may have an externally-threaded boss, an outwardly-directed flange at one end of the boss, and an internally-thread bore through the boss the internal diameter of which tapers inwardly towards the free end of the boss remote from the flange. The collar maybe fitted by threading the boss of the collar into the threaded hole in the plate and tightening the flange down on to the plate, and then running a parallel threaded bolt or plug through the internally-threaded bore from the flanged end thereof so as to deform radially outwardly the material of the boss in the region of the taper of the internal thread, thereby locking the collar in place.

According to yet another aspect of the present invention, there is provided a tool for cutting a threaded hole through a plate such as a tank lid, comprising: a tapered tap; a centre-less rotary hole-cutter; and means mounting the hole-cutter substantially co-axially on the leading end of the tap, which means transfers rotary drive from the tap to the hole-cutter and permits the axis of the hole-cutter to move resiliently out of alignment with the axis of the tap.

A conventional design of a rotary hole cutter has a cylindrical wall formed with cutting teeth at its leading circular edge, the cylindrical wall being mounted on or integrally-formed with a circular end wall through which a drill co-axially extends, the cutting end of the drill being ahead of the teeth of the hole cutter. In this way, the drill forms a pilot hole through the plate to be cut and then serves to centre the hole cutter itself. However, penetration of the plate by the drill opens the tank even before the hole cutter has started to cut the plate. By using a centre-less hole cutter (that is, a hole cutter not having a drill for forming a pilot hole), this early opening of the tank is obviated.

It is very difficult to prevent a conventional design of hole cutter but not provided with a pilot drill from wandering during the early stage of rotary cutting, unless rigid support can be provided for, and immediately adjacent, the hole cutter. However, it has now been determined that by furnishing a resilient mounting arrangement for the hole cutter, as defined above, the tendency for the hole cutter to wander is greatly reduced and it is possible to cut a hole using the tool of this invention more or less exactly where required, even when the hole cutter is mounted on the leading end of a tapered tap, and with the nearest bearing giving radial location for the hole cutter being above the tap itself.

In the tool of this invention, it is preferred for the tapered tap to include a reamer section between the leading end of the tap, on which is mounted the rotary centre-less hole-cutter, and the threaded portion of the tap. Such a reamer may clean-up the hole formed by the hole cutter to an exact size, prior to the threading thereof.

This invention further provides a rig for forming a threaded hole through a wall of a tank, such as an underground petrol tank, which rig comprises a tool of this invention as defined above, in combination with supporting means to support the tool and to impart rotary drive thereto, said supporting means including means to advance the tool at a controlled rate as cutting of the hole advances and during threading of the hole, and isolating means to maintain an inert atmosphere on the outside of the tank in the region of the hole being cut through the tank wall and during the tapping thereof by said tool.

The isolating means may comprise a sleeve which surrounds the tool and is arranged to bear on the outside wall of the tank, and means to supply an inert gas such as nitrogen or carbon dioxide to the interior of the sleeve. The tool preferably is mounted on a drive shaft and there is provided a bearing on the drive shaft in the region of the mounting of the tool on the drive shaft, which bearing has a plurality or outwardly projecting arms arranged to engage fixed surfaces in the vicinity of the tank wall being cut, such as the sides of the chamber immediately above the tank, so as to stabilise the tool during the operation of the hole-cutter. In this case, said sleeve may be mounted at its upper end on the bearing, so as to form a substantially closed-space surrounding the tool.

By way of example only, the various aspects of this invention will be described in further detail referring to the accompanying drawings in which:

FIG. 4 is an enlarged view on the upper portion of the isolating arrangement used with the tool of FIG. 3.

FIG. 5 shows an example of a collar threaded in the hole formed by the tool.

Figure 1:
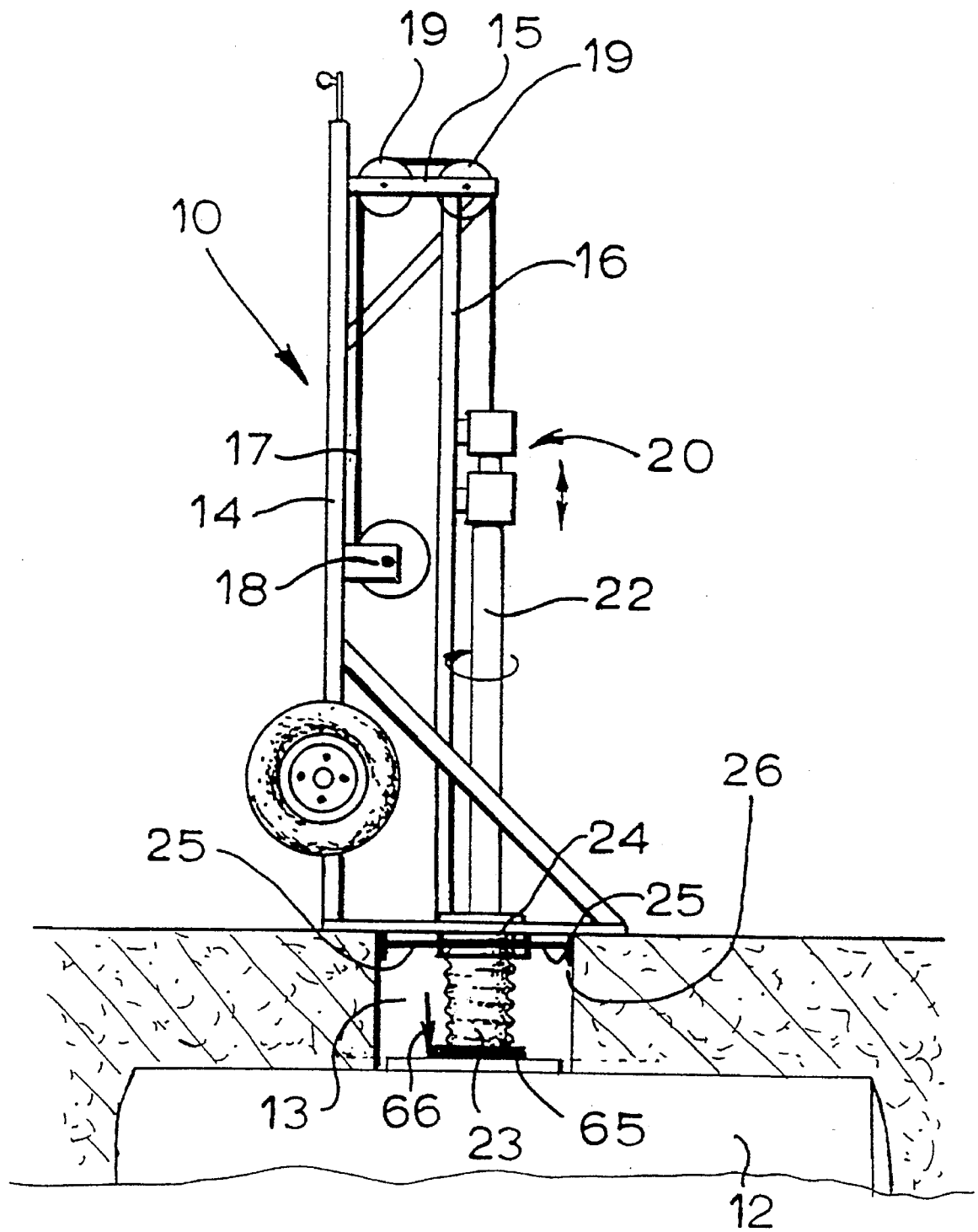
FIG. 1 is a diagrammatic side view of a rig for forming a hole through a lid of an underground petrol tank.
Figure 2:
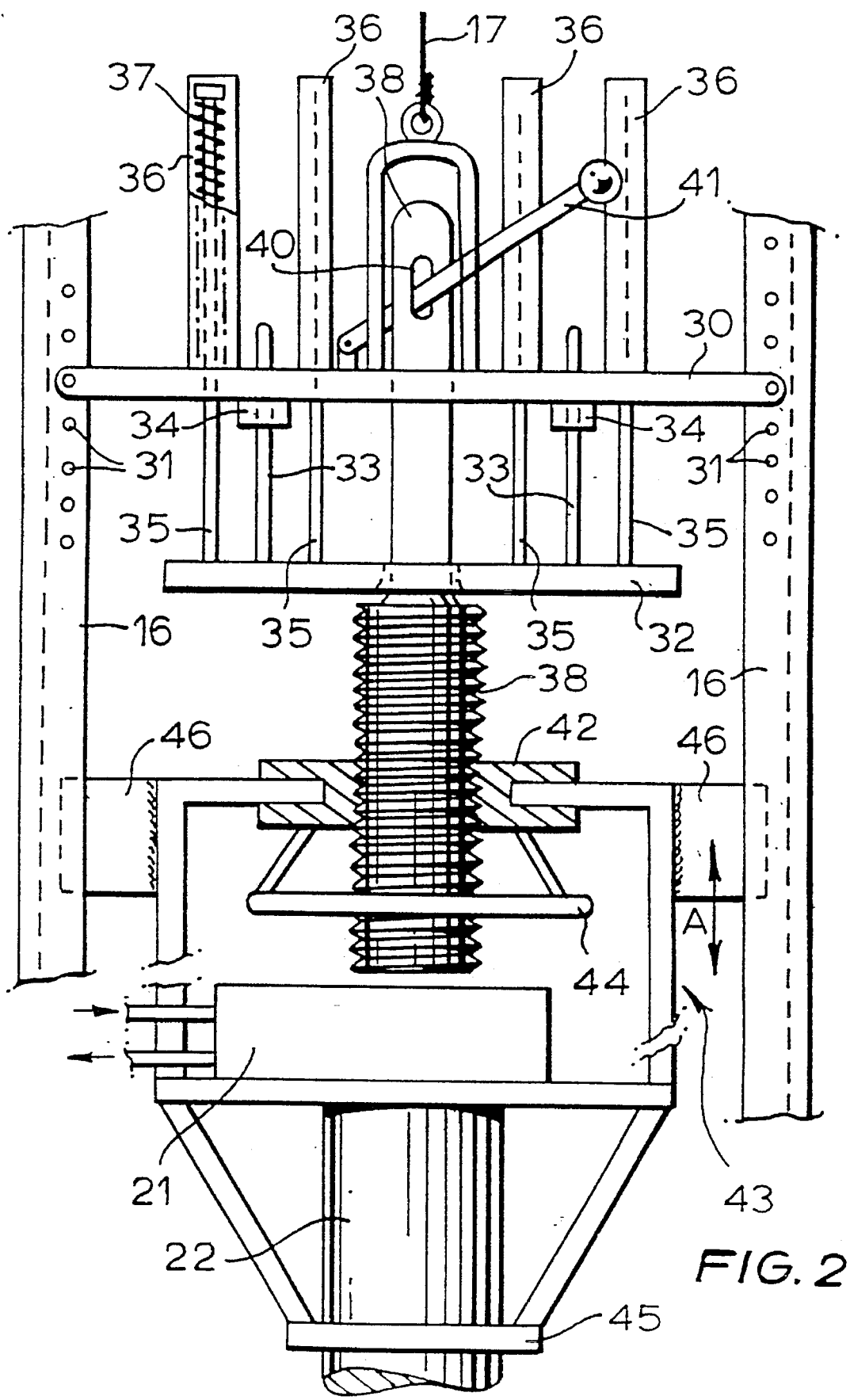
FIG. 2 is a front view of the slide head assembly forming a part of the rig of FIG. 1.

Referring initially to FIGS. 1 and 2, there is shown a rig 10 arranged to form a threaded hole through the lid 11 of an underground petrol tank 12, without the need to remove the lid from the tank. Access is gained to the lid 11 through a chamber 13 which is normally closed by a man-hole cover (not shown) and in which chamber extends appropriate pipe-work connecting the tank to a filling point and to petrol pumps for drawing petrol from the tank.

The rig is in the form of a wheeled framework which may be towed from place to place as required, and then up-ended to the position shown in FIG. 1, over the lid to be drilled. When up-ended, the rig provides a mast 14 having, at its upper end, a support arm 15 and a pair of guides 16 extending generally vertically. A cable 17 from a winch 18 extends over a pair of pulleys 19 provided on the support arm 15 and suspends a slide head assembly 20, shown in greater detail in FIG. 2. The slide head assembly is constrained to run along the fixed guides 16 and may be raised and lowered by means of the winch 18.

An hydraulic motor 21 (FIG. 2) is mounted on the slide head assembly 20 and rotatably supports a drive tube 22, extending down into the chamber 13. The lower end of the drive tube carries a hole cutting and tapping tool (FIG. 3) surrounded by a flexible convoluted sleeve 23, the lower end of which bears on the lid 11. The upper end of the sleeve 23 is supported by a ring 24 having telescopically-adjustable radially-extending arms 25, the outer ends of which terminate in pads 26. The arms are adjusted so that the pads 26 engage the sides of the chamber 13, in order to give location for the tool at the lower end of the drive tube 22.

Referring to FIG. 2, it can be seen that the slide head assembly comprises a top plate 30 suspended from the cable 17, and overlying the guides 16. The ends of the top plate 30 may be pinned to the guides by inserting pegs through aligned holes in the plate and a chosen pair of a series of holes 31 in the two guides 16.

A pressure plate 32 is disposed below the top plate 30 and has a pair of upstanding location rods 33 extending through bushes 34 mounted on the top plate 30. These serve to maintain the two plates parallel whilst allowing the pressure plate to move vertically with respect to the top plate. Four suspension rods 35 project upwardly from the pressure plate 32, through respective apertures in the top plate 30 and into housings 36 in each of which is disposed a respective compression spring 37, acting between the top plate 30 and the upper ends of the respective rod 35.

Extending through a central bore in the pressure plate 32 is a shaft 38, pinned against movement with respect to the pressure plate, the shaft also passing through an opening in the top plate 30 and having an aperture 40 above that plate, though which extends a control lever 41. Below the pressure plate 32, the shaft 39 is threaded, a nut 42 being engaged therewith. The nut is rotatably received in a lower section 43 of the slide head assembly, and is provided with a hand-wheel 44 to effect rotation thereof. The hydraulic motor 21 is mounted on the lower section 43, which also provides an upper bearing 45 for the drive tube 22. The lower section 43 has two brackets 46 engaging behind the guides 16, so as to maintain the sections in sliding contact with those guides.

Figure 3:
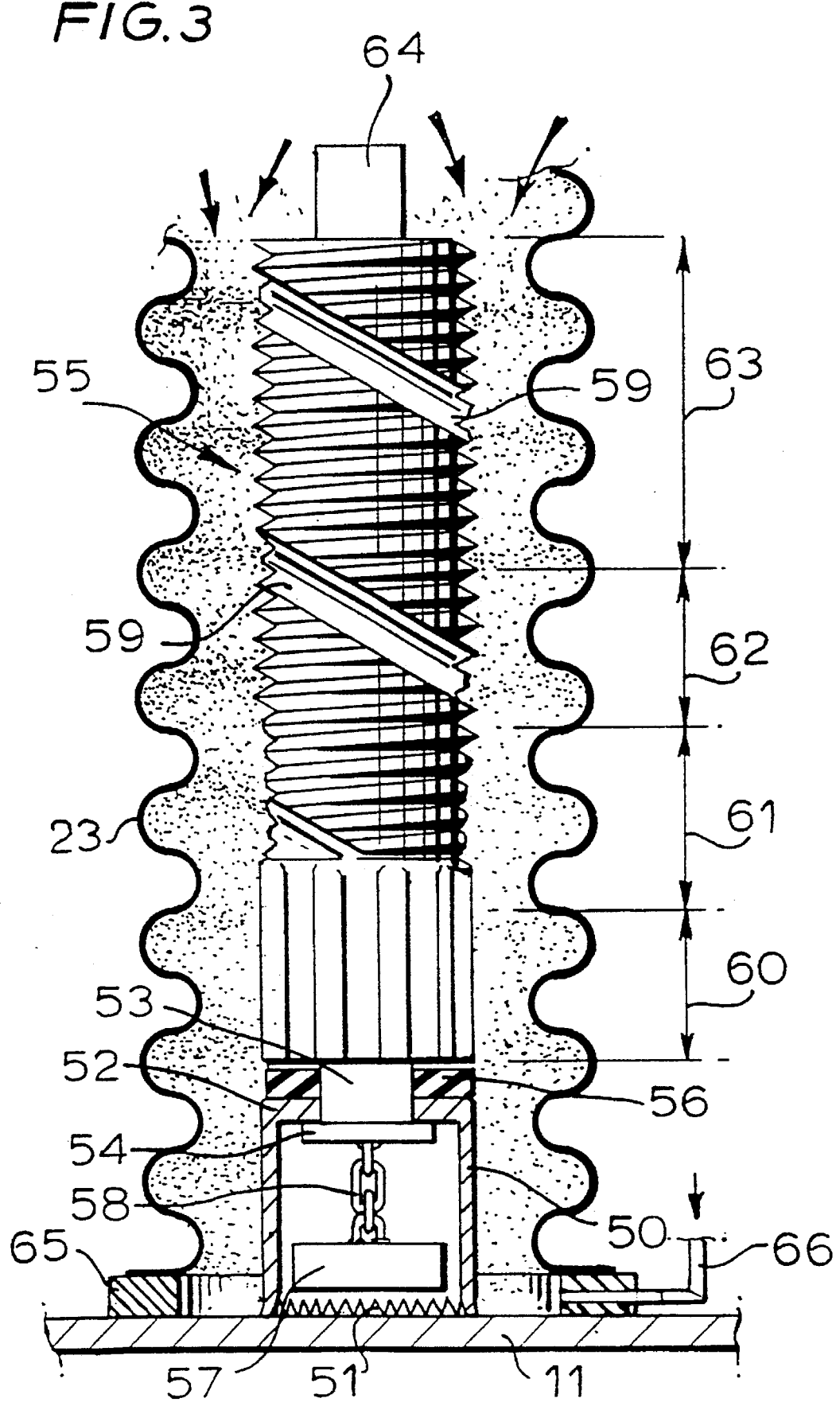
FIG. 3 shows a hole cutting and tapping tool, employed by the rig of FIG. 1.

Referring now to FIG. 3, there is shown the tool for firstly cutting a hole through the tank lid 11 and then for tapping that hole. The tool comprises a centre-less hole cutter 50 having a cylindrical wall formed with cutting teeth 51 at its lower end, the wall projecting downwardly from a mounting plate 52 at the upper end of the cutter. The plate 52 has a square central opening through which extends a square drive spigot 53 having an enlarged head 54 within the hole cutter 50. The spigot 53 is screw-threaded into a complex tap 55, with a resilient pad 56, for example of hard rubber, being provided between the lower end face of the tap 55 and the plate 52 of the hole cutter 50.

A magnet 57 is located within the hole cutter 50 and is suspended for example by means of a chain 58 from the head 54, at such a position that the magnet will engage and hold a disc cut from the lid 11, by the teeth 51 of the hole cutter 50.

The complex tap 55 has coarse spiral flutes 59 and is divided into four consecutive sections. From the lower end of the tap, these comprise:

a reamer section 60 adapted to finish the hole cut by the hole cutter 50 to a precise diameter suitable for threading;

a first, or starting, tap section 61 adapted to commence cutting the thread of the required form in the hole cleaned by the reamer section 60;

a second, or intermediate tap section 62 adapted to cut the required thread profile commenced by the first tap section 61; and a final tap section 63 of an essentially parallel form, adapted to clean-up and finish the thread profile in the hole through the tank lid.

The upper end of the complex tap 55 has a mounting and drive boss 64, by means of which the tap is mounted on the drive tube 22.

Referring now to FIGS. 3 and 4, it can be seen the convoluted and resiliently deformable sleeve 23 surrounds the cutting and tapping tool, and terminates at its lower end in a ring 65, lightly to seal against the tank lid 11. This seal is not intended to be gas tight and should allow the leakage of supplied inert gas out of the sleeve. A port 66 is provided through the ring 65, to permit the ingress of an inert gas, such as carbon dioxide or nitrogen, to the interior of the sleeve. That gas is directed to the cutting region of the cutter 50, so as to assist in blowing away swarf produced by the cutting operation.

The upper end of the sleeve 23 is held in the ring 24 which carries the telescopic arms 25, the ring 24 surrounding, but being rotatable with respect to, the drive tube 22. A circlip 66 is mounted on the drive tube below the ring 24, such that raising of the drive tube, by lifting the slide head assembly 20, will lift the sleeve 23, but such that the drive tube may move downwardly from the position shown in FIG. 4, within the sleeve. In an alternative arrangement, the upper end of the sleeve 23 simply bears on the ring 24: in this case, the sleeve will be left in position on withdrawing the tool from a cut hole.

The rig and tool described above is used by carefully positioning the rig over the tank lid 11 so that the hole cutter 50 is positioned co-axially over the point at which the hole is to be formed. The arms 25 are adjusted firmly to engage the internal walls of the chamber 11 and so to locate the drive tube 22 vertically over that point. The lower section 43 of the slide head assembly 20 is raised fully the on threaded part of shaft 38, by turning the hand wheel 44, and the slide head is lowered by means of winch 18 until the cutter 50 engages the tank lid; the top plate 30 is then pegged to the guides 16. When so positioned, the ring 65 at the lower end of the sleeve 23 bears on the tank lid and inert gas is supplied to the interior of the sleeve through port 66 to drive out all air. By using an inert gas of a greater density than air, the chamber 13 will gradually fill with that gas, so displacing air therefrom, as well.

Rotation of the cutter 40 may then be commenced, by powering the hydraulic motor 21, which rotates the drive tube 22. Pressure is maintained on the cutter by turning the hand-wheel 44 to thread nut 42 along shaft 38, as the cutting proceeds.

In the above way, a hole is cut through the tank lid 11, in the presence of an inert atmosphere which effectively removes the risk of an explosion. The tank lid is opened only at the moment the hole cutter penetrates the lid, and the cut disk of the lid is held by the magnet 57, so preventing the disk (which may be at least warm) falling into the tank. After the cutting of the hole, rotation of the drive tube 22 is continued whilst the tube is lowered relatively quickly by means of lever 41, so as successively to move into the cut hole the reamer section 60, and then the first, intermediate and final tap sections 61 to 64. When the tapping has been completed, the direction of rotation of the tube 22 is reversed, and the lever 41 raised to lift the drive tube and pull the cutting tool clear of the lid. During the tapping operation, the weight of the drive tube, cutter and tap are largely balanced by springs 37, so greatly reducing the force which has to be applied to the lever 41.

Referring now to FIG. 5, there is shown a threaded collar suitable for fitting into a tapped hole formed for example by means of the rig and tool described above. This collar comprises a sleeve 70 threaded internally with a relatively coarse thread, and from which depends a boss 71, threaded both internally and externally. The external threads 72 are of a parallel form, and correspond with the threads formed in the hole cut through the tank lid 11; these threads may be relatively fine. The internal threads 73 formed in the boss 61 are parallel for the first part of the length of the boss, where the boss extends through the lid 11, and then taper inwardly, typically by approximately the depth of the thread itself, as shown by dimension t. A groove for a sealing washer 74 is formed in the shoulder between the external surface of sleeve 70 and the external threads 72.

The collar of FIG. 5 is used by being threaded into the tapped hole in the lid 11, and being tightened down so that the shoulder at the lower end of the sleeve 70 tightly engages the tank lid 11, compressing washer 74. Then, a parallel threaded plug of the same thread form as the first part of the internal thread 72 is threaded from above into the boss 71. After passing through the parallel part of the internal threads 72, the plug then deforms radially outwardly the tapered part of the boss 71 and this has the effect of flaring the external threads 72 outwardly, from immediately below the tank lid 11. In this way, the collar is tightly locked in position and is restrained against loosening.

I claim:

1. A method of forming a threaded hole through a plate such as a tank lid, comprising advancing a rotary hole-cutter into the plate to form a circular hole therethrough, continuing to advance the hole-cutter beyond the plate and following the hole-cutter into the cut hole with a tapered tap having a required thread form whilst rotating the tap to form a thread in the hole, in which method the circular hole is formed with a centre-less hole cutter and in that an inert atmosphere is maintained on the side of the plate from which the cutting was commenced, in the region of the hole being cut through the plate both during the cutting and subsequent tapping thereof.

2. A method according to claim 1, in which the inert atmosphere is maintained by surrounding the hole-cutter and the tap with a sleeve which also bears on the plate, and supplying an inert gas to the interior of the sleeve.

3. A method according to claim 2, in which the direction of advancement of the hole-cutter and the tap is generally vertically downwardly and the sleeve bears on the plate at its lower end, and the inert atmosphere is maintained by supplying a gas of a density greater than that of air to the upper end of the sleeve.

4. A method according to claim 3, in which the inert atmosphere maintained in the region of the hole being cut is one of nitrogen or carbon-dioxide.

5. A method according to claim 1 in which the plate through which the tapped hole is to be formed is the lid of a subterranean petrol storage tank.

6. A tool for cutting a threaded hole through a plate such as a tank lid, which tool comprises a tapered tap, a centre-less rotary hole-cutter, and mounting means mounting the hole-cutter substantially co-axially on the leading end of the tap, which said mounting means transfers rotary drive from the tap to the hole-cutter and permits the axis of the hole-cutter to move resiliently out of alignment with the axis of the tap.

7. A tool as claimed in claim 6, wherein said mounting means includes a resilient pad disposed between the leading end face of the tap and a rear face of the hole-cutter.

8. A tool as claimed in claim 6, wherein the tap is provided with a reamer section between the leading end thereof and the threaded portion of the tap.

9. A tool as claimed in claim 6, wherein the tap includes, in order from the leading end thereof, a taper section, an intermediate section and a parallel section so as fully to form a finished thread on being fully threaded into a hole cut by the hole-cutter.

10. A rig for forming a threaded hole through a tank wall or lid, comprising a tool as claimed in claim 6 in combination with supporting means to support the tool and to impart rotary drive thereto, said supporting means including means to advance the tool at a controlled rate as cutting of the hole advances and during threading of the hole, and isolating means to maintain an inert atmosphere on the outside of the tank in the region of the hole being cut through the tank wall or lid and during the tapping thereof by said tool.

11. A rig as claimed in claim 10, wherein the isolating means comprises a sleeve which surrounds the tool and is arranged to bear on the outside wall of or lie against the wall or lid, and means to supply an inert gas to the interior of the sleeve.

12. A rig as claimed in claim 10, wherein the tool is mounted on a drive shaft and there is provided a bearing on the drive shaft in the region of the mounting of the tool on the drive shaft, which bearing has a plurality of outwardly projecting arms arranged to engage fixed surfaces in the vicinity of the tank wall or lid being cut so as to stabilize the tool during the operation of the hole-cutter.

13. A rig as claimed in claim 12, wherein each of said arms is telescopically-adjustable, to allow positioning of the tool to cut a hole at the desired site.

14. A method according to claim 1, in which the inert atmosphere maintained in the region of the hole being cut is one of nitrogen or carbon-dioxide.

15. A tool as claimed in claim 7, wherein the tap includes, in order from the leading end thereof, a reamer section, a taper tapping section, an intermediate tapping section and a parallel tapping section, so as to form a finished thread on being fully threaded into a hole cut by said centre-less hole-cutter.

* * * * *